L. G. BAYRER.
DIE SINKING MACHINE.
APPLICATION FILED OCT. 14, 1919.

1,354,942.

Patented Oct. 5, 1920
2 SHEETS—SHEET 1.

Inventor
Louis G. Bayrer
Harry P. Williams
atty.

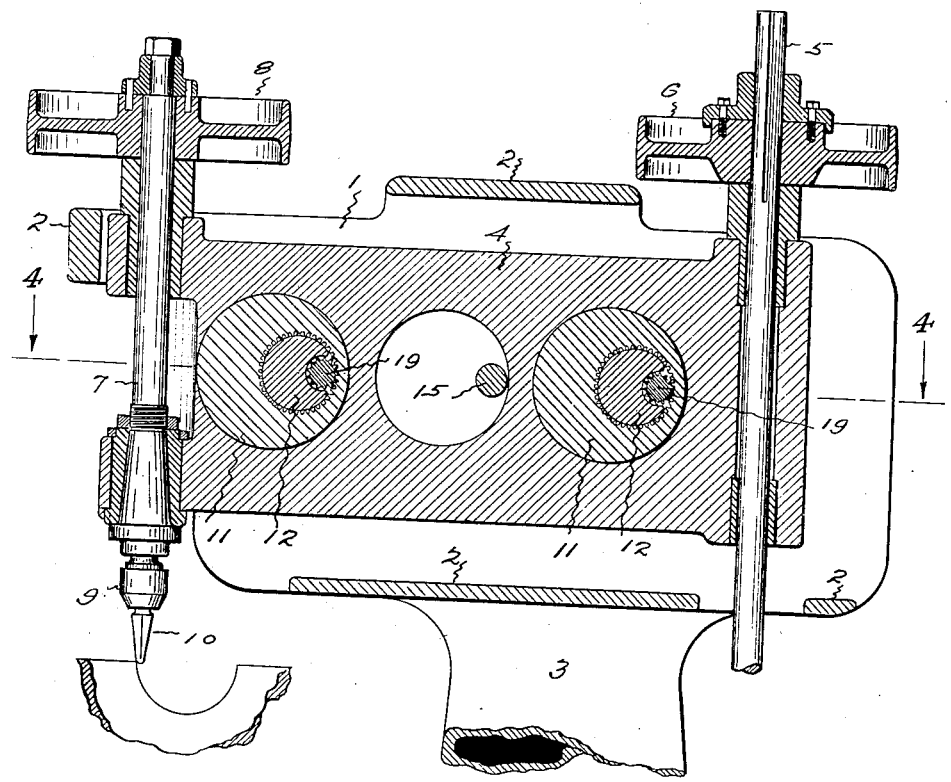
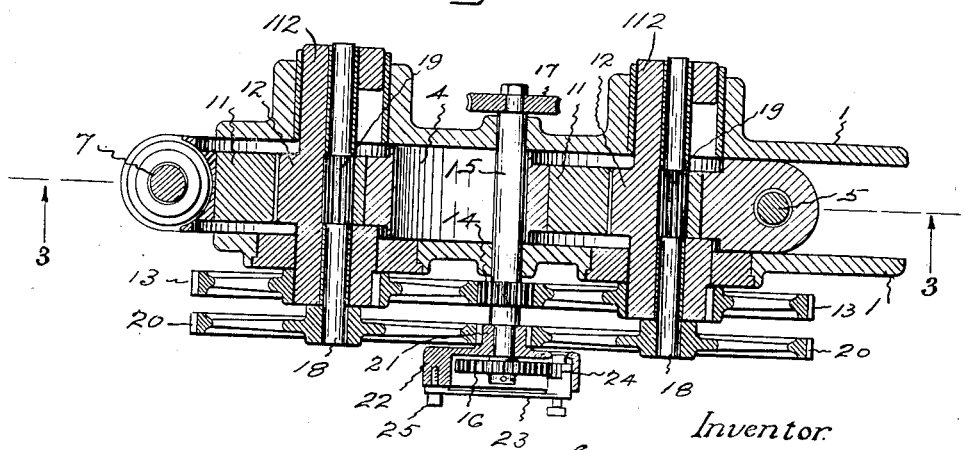

UNITED STATES PATENT OFFICE.

LOUIS G. BAYRER, OF HARTFORD, CONNECTICUT.

DIE-SINKING MACHINE.

1,354,942. Specification of Letters Patent. Patented Oct. 5, 1920.

Application filed October 14, 1919. Serial No. 330,587.

*To all whom it may concern:*

Be it known that I, LOUIS G. BAYRER, a citizen of the United States, residing at Hartford, in the county of Hartford and State of Connecticut, have invented a new and useful Improvement in Die-Sinking Machines, of which the following is a specification.

This invention relates to those machines which are designed for forming the cavities in dies, more particularly those dies for shaping large and heavy pieces which are to be produced by drop-forging and which require massive die blocks of hard metal.

The object of the invention is to provide a machine of this character which is especially adapted for cherry cutting, that is, forming spherical cavities in die blocks, and which is so adjustable that cavities of any required arc and depth, within the capacity of the machine, may be cut.

This object is attained by constructing a die sinking machine in such manner that the cutter or cherry bur while rapidly rotated for cutting away the metal will automatically be fed in a vertical plane on the arc of the necessary circle to produce the cavity of the desired circular outline.

Figure 1:
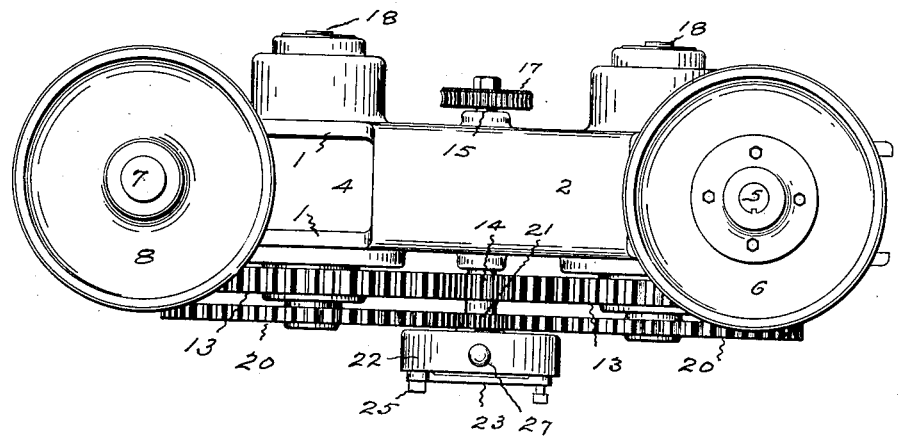
Figure 2:
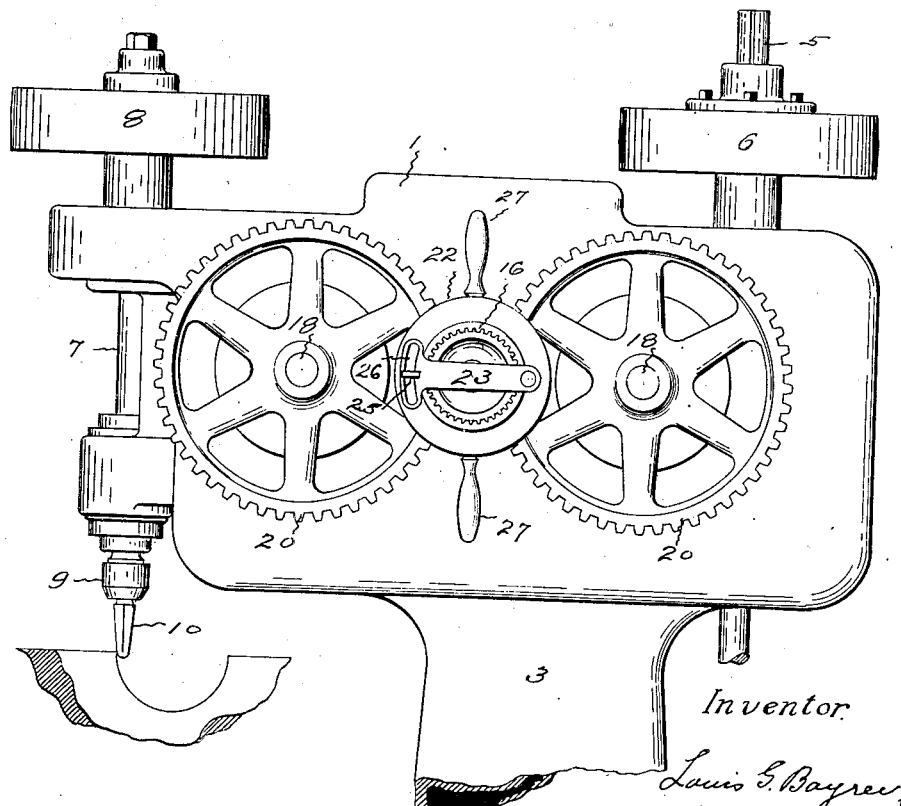

Figure 1 of the accompanying drawings shows a plan of the machine which embodies the invention. Fig. 2 shows a side elevation of the same. Fig. 3 is a vertical section on the plane indicated by the dotted line 3—3 on Fig. 4. Fig. 4 is a vertical section on the plane indicated by the dotted line 4—4 on Fig. 3.

The machine illustrated has a box frame formed of two vertical side plates 1 which are held parallel by tie pieces 2 that extend transversely between the side plates, this frame being mounted on any suitable standard 3.

Movably supported between the side plates of the frame is a head 4. Held by bearings at one end of the head is a shaft 5 bearing a pulley 6. This shaft is designed to be connected by any suitable joint with a driving means. Held by bearings at the other end of the head is the tool spindle 7 which at the upper end has a pulley 8. At the lower end of the spindle is a chuck 9 which holds the cutting tool or cherry bur 10 of common form.

When the pulleys are belted together and power is applied to the drive shaft the tool spindle and tool are rapidly rotated. The drive shaft and drive pulley and the tool spindle with its pulley and cutting tool move with the head without interfering with the rotation of the tool.

The head is mounted upon two similar compound eccentrics, each compound eccentric consisting of an outer eccentric 11 which turns in the head and an inner eccentric 12 which turns in the outer eccentric and that has tubular arbors 112 supported in bearings in the side plates of the frame. Keyed on one end of the arbors of the inner eccentrics outside of the frame are gears 13. These gears are engaged by a pinion 14 fixed on a shaft 15 that is supported by the side plates of the frame and on one end has a gear 16 and on the other end a worm wheel 17. This worm wheel is designed to be engaged by a worm that may be turned by hand or from any suitable source of power. When the worm wheel shaft is rotated its fixed pinion through the gears mentioned rotates the eccentrics coincidently and in the same direction and imparts a circular motion in a vertical plane to the head between the side plates of the frame, and the rotating cutting point of the tool which is carried by the head is caused to travel on a circle in a vertical plane, the diameter of which circle depends upon the throw of the eccentrics.

For the purpose of adjusting the eccentrics and changing their throw, and consequently varying the arc upon which the point of the cutter will travel, spindles 18 are passed through the inner eccentrics and their tubular arbors. Fixed on these spindles are pinions 19 arranged to mesh with teeth cut in the bearing surface of the openings through the outer eccentrics. Keyed on the outer ends of the spindles are gears 20 which are engaged by a pinion 21 formed on the hub of a circular box 22 that is loosely mounted on the worm wheel shaft 15 inside of the gear 16 which is inclosed by the box.

Rotatably and slidably mounted on the box is a lever 23 the hub of which has teeth 24 designed to engage the teeth of the gear 16. This lever extends across the front of the box and may be secured in position by a turn button 25 that passes into the box through a slot 26 in the end of the lever. When the button is turned to one position this lever may be drawn out and its teeth disengaged from the gear 16 on the shaft 15.

Then by means of the handles 27 the box may be rotated freely on the shaft and as it is rotated the pinion which it carries turns the gears 20 that are keyed to the spindles 18 which bear the pinions 19 that mesh with the teeth in the outer eccentrics. By means of this gearing both of the outer eccentrics may be coincidently and equally turned on the inner eccentrics so as to vary their eccentricity with relation to the axis of the inner eccentrics and consequently change their throw. The eccentrics may be adjusted by this mechanism so that the amount of travel of the head and the parts it carries will be the result of the combined eccentricities of both inner and outer eccentrics or the outer eccentrics may be set to neutralize the inner eccentrics so the head will have no movement, and consequently the travel of the point of the cutter may be quickly adjusted to cut the metal to any required arc. When a rough adjustment is completed the lever is pushed in so its teeth will engage the gear 16 then it may be turned up or down to change the relation of the box and its pinion with relation to the shaft 15 and the eccentric driving pinion and gears, for obtaining a fine adjustment. After the fine adjustment is obtained and the lever is secured by the turn button, the adjusting pinion and gears and driving pinion and gears will be locked together, and being of the same size will rotate both members of each compound eccentric as one piece.

The invention claimed is:—

1. In a die sinking machine the combination of a rotatory cutter, a support for said cutter, means for rotating the cutter on a longitudinal axis, and means comprising a pair of compound rotatably adjustable eccentrics for carrying said support and cutter bodily in a common, circular path in the plane of the longitudinal axis of the cutter.

2. In a die sinking machine the combination of a rotatory cutter, means for rotating the cutter on a vertical axis, and a pair of eccentrics, each pair consisting of an inner member and an outer adjustable member for imparting to the cutter a bodily, circular motion in a vertical plane, whereby the depth, width and curvature of the cut made by the cutter may be varied.

3. In a die sinking machine the combination of a cutter, a rotatory spindle carrying said cutter, means for rotating the spindle, a movable head carrying said spindle, outer eccentrics turning in the head, inner eccentrics turning in the outer eccentrics, means for adjusting the outer eccentrics on the inner eccentrics, and gearing for rotating the eccentrics together and thereby imparting to the head, spindle and cutter a common, circular movement.

4. In a die sinking machine the combination of a cutter, a rotatory spindle carrying said cutter, means for rotating said spindle, a movable head carrying said spindle, rotatably adjustable eccentrics carrying said head, and means for rotating the eccentrics.

5. In a die sinking machine the combination of a cutter, a rotatory spindle carrying said cutter, means for rotating the spindle, a movable head carrying said spindle and its rotating means, rotatably adjustable eccentrics supporting said head, and means for adjusting the eccentrics.

6. In a die sinking machine the combination of a cutter, a rotatory spindle carrying said cutter, a drive shaft, a drive belt connecting said spindle and shaft, a movable head carrying said spindle, shaft and belt, rotatable eccentrics supporting said head, and means for rotating the eccentrics.

7. In a die sinking machine the combination of a frame, a head movable in the frame, rotatable eccentrics rotatably mounted in the same horizontal plane in the frame and turning in and carrying the head, a cutter spindle carried by the head, a drive shaft carried by the head, and a belt connecting the cutter spindle and the drive shaft.

8. In a die sinking machine the combination of a frame, a head movable in the frame, compound eccentrics turning in and carrying the head, means for rotating and adjusting one member of said compound eccentrics with relation to the other, a rotatory tool spindle carried by the head, and a rotatory drive shaft carried by the head.

9. In a die sinking machine the combination of a cutter, a rotatory spindle carrying said cutter, means for rotating the spindle, a movable head carrying said spindle, and compound eccentrics located in the head and turning on axes at right angles to the axis of the spindle for imparting a circular movement to said head.

10. In a die sinking machine the combination of a cutter, a rotatory spindle carrying said cutter, a movable head carrying said spindle, rotatable eccentrics supporting the head, rotatable eccentrics turning in the head supporting eccentrics, and means for rotating all of the eccentrics coincidently.

11. In a die sinking machine the combination of a cutter, a rotatory spindle carrying said cutter, a movable head carrying said spindle, compound rotatable eccentrics supporting said head, gearing for rotating the compound eccentrics, gearing for rotating and adjusting one member of each compound eccentric independently of the other member of each compound eccentric, and means connecting said gearing so the eccentric members will rotate coincidently.

12. In a die sinking machine the combination of a cutter, a rotatory spindle carrying said cutter, a drive shaft, a movable head carrying said spindle and shaft, rotatable eccentrics supporting said head, each of said eccentrics comprising an outer member turning in the head and on an inner member, and means for coincidently adjusting said outer members of the eccentrics independently of said inner members.

13. In a die sinking machine the combination of a frame, a head movably supported by the frame, compound eccentrics comprising outer and inner members rotatably mounted on the frame and carrying the head, gearing for rotating said outer eccentric members together, gearing for rotating said inner eccentric members together, means for locking together or disconnecting from each other said gearing, a cutter spindle carried by the head, and a drive spindle carried by the head.

14. In a die sinking machine the combination of a frame, a head movably supported between the sides of the frame, an outer eccentric turning in the head, an inner eccentric turning in the outer eccentric, means extending through the inner eccentric and engaging the outer eccentric for adjusting the outer eccentric with relation to the inner eccentric, gearing for turning the outer eccentric with or independently of the inner eccentric, and a rotatory tool spindle carried by the head.

15. In a die sinking machine, a spindle head, adjustable eccentrics carrying the head, drive eccentrics in the adjustable eccentrics, means for rotating the adjustable eccentrics independently of the drive eccentrics, and means for locking the adjustable and drive eccentrics together so they will rotate coincidently.

LOUIS G. BAYRER.